US009183006B2

(12) United States Patent  
Turcotte et al.

(10) Patent No.: US 9,183,006 B2  
(45) Date of Patent: Nov. 10, 2015

(54) SYSTEMS AND METHODS FOR LAYOUT OF GRAPHIC OBJECTS FOR ELECTRONIC DISPLAY, PRINT OR OTHER OUTPUT

(75) Inventors: Kenneth A. Turcotte, Folsom, CA (US); Daniel A. Kaye, Folsom, CA (US); Christopher H. Davey, Sacramento, CA (US); Peter A. Tjeerdsma, Fair Oaks, CA (US); Michael R. Moore, Folsom, CA (US)

(73) Assignee: VISAN INDUSTRIES, Folsom, CA (US)

( * ) Notice: Subject to any disclaimer, the term of this patent is extended or adjusted under 35 U.S.C. 154(b) by 420 days.

(21) Appl. No.: 13/598,424

(22) Filed: Aug. 29, 2012

(65) Prior Publication Data

US 2013/0055055 A1 Feb. 28, 2013

Related U.S. Application Data

(60) Provisional application No. 61/529,798, filed on Aug. 31, 2011.

(51) Int. Cl.
  *G06F 17/00* (2006.01)
  *G06F 9/44* (2006.01)
  *G06F 17/21* (2006.01)

(52) U.S. Cl.
  CPC ............ *G06F 9/4443* (2013.01); *G06F 17/212* (2013.01)

(58) Field of Classification Search
  CPC .............................. G06F 17/211; G06F 17/212
  USPC .................. 715/201, 243, 244, 246, 247, 253
  See application file for complete search history.

(56) References Cited

U.S. PATENT DOCUMENTS

| | | | | | |
|---|---|---|---|---|---|
| 5,544,301 | A | * | 8/1996 | Orton et al. | 715/798 |
| 5,548,692 | A | * | 8/1996 | Cok | 715/815 |
| 5,572,639 | A | * | 11/1996 | Gantt | 345/651 |
| 5,634,133 | A | * | 5/1997 | Kelley | 715/209 |
| 5,796,401 | A | * | 8/1998 | Winer | 345/619 |
| 6,029,195 | A | * | 2/2000 | Herz | 725/116 |
| 6,320,602 | B1 | * | 11/2001 | Burkardt et al. | 715/817 |
| 6,826,727 | B1 | * | 11/2004 | Mohr et al. | 715/235 |
| 6,961,064 | B2 | * | 11/2005 | Bushey | 345/546 |
| 6,973,627 | B1 | * | 12/2005 | Appling | 715/781 |
| 7,765,508 | B1 | * | 7/2010 | Roberts et al. | 716/122 |
| 7,823,068 | B2 | * | 10/2010 | Cowtan et al. | 715/738 |
| 7,936,922 | B2 | * | 5/2011 | Berger | 382/173 |
| 8,161,384 | B2 | * | 4/2012 | Atkins et al. | 715/273 |
| 2001/0044810 | A1 | * | 11/2001 | Timmons | 707/513 |
| 2002/0149588 | A1 | * | 10/2002 | Babcock | 345/468 |
| 2002/0184261 | A1 | * | 12/2002 | Yamane | 707/503 |
| 2004/0177323 | A1 | * | 9/2004 | Kaasila et al. | 715/513 |

(Continued)

*Primary Examiner* — Laurie Ries  
(74) *Attorney, Agent, or Firm* — Tucker Ellis LLP (57) ABSTRACT

Systems and methods for layout of graphic objects such as photographic images and graphical elements, for electronic display, print or other output. In accordance with an embodiment, a graphic layout logic automatically arranges the graphic objects within a target area, including determining a best combination of rows and/or columns of objects. Optional controls can also be provided to allow manual or user control of, e.g., overlapping, cropping, offsetting, or rotation of the graphic objects or images, for aesthetic design or other reasons. Examples of the types of graphic objects that can be arranged or laid out in this manner include digital photographs, text, clipart, graphical images, illustrations, software user interfaces, graphic elements such as icons, buttons, menus and whitespace, user interface windows, digital video or media streams, and other image media.

22 Claims, 8 Drawing Sheets

(56) References Cited

U.S. PATENT DOCUMENTS

| | | | |
|---|---|---|---|
| 2005/0122347 A1* | 6/2005 | Buerkle et al. | 345/660 |
| 2008/0022197 A1* | 1/2008 | Bargeron et al. | 715/246 |
| 2008/0109477 A1* | 5/2008 | Lue | 707/102 |
| 2009/0204888 A1* | 8/2009 | Miyamoto | 715/243 |
| 2010/0275152 A1* | 10/2010 | Atkins et al. | 715/788 |
| 2010/0333017 A1* | 12/2010 | Ortiz | 715/800 |
| 2011/0276868 A1* | 11/2011 | Hoke et al. | 715/217 |
| 2012/0182317 A1* | 7/2012 | Mansfield et al. | 345/643 |

* cited by examiner

SYSTEMS AND METHODS FOR LAYOUT OF GRAPHIC OBJECTS FOR ELECTRONIC DISPLAY, PRINT OR OTHER OUTPUT

CLAIM OF PRIORITY

This application claims the benefit of priority to United States Provisional Patent Application titled "SYSTEMS AND METHODS FOR LAYOUT OF IMAGES AND GRAPHIC ELEMENTS FOR ELECTRONIC DISPLAY OR PRINT OUTPUT", Application No. 61/529,798, filed Aug. 31, 2011, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present invention are generally related to computer systems and software, and are particularly related to systems and methods for enabling layout of graphic objects, such as photographic images or graphical elements, for electronic display, print, or other output.

BACKGROUND

Layouts of graphical elements, such as digital photographs intended for printing on products such as wall calendars, have traditionally been presented using grid or collage formats. Both of these formats have their own behaviors and limitations.

For example, grids are generally rigid, and graphical elements used therewith must typically be cropped to fit within fixed-aspect sockets in the grid. This typically requires user interaction to ensure that the desired parts of the graphical elements are shown (e.g., with photographs of people, that the person's face is not cut off from the final image). Image-processing techniques, such as face-recognition, can sometimes be used in an attempt to automatically adjust, e.g., image crop settings. However, this does not solve the root problem, namely that the graphical elements should not need to be cropped in the first place.

Collages are generally more free-form, typically allowing the full original area of the graphical elements to be maintained. However, collages are usually pre-determined to be aesthetically pleasing, and problems can arise if the graphic objects do not match the intended aspect of a given socket (e.g., a landscape vs. portrait orientation), or if they do not fit the intended look of the layout. As with grid formats, the fixed sockets of a collage are typically laid out in advance, and graphic elements must be chosen to fit the aspect ratio of each socket, or cropped or reduced in size. These are the general areas that embodiments of the invention are intended to address.

SUMMARY

Disclosed herein are systems and methods for layout of graphic objects such as photographic images and graphical elements, for electronic display, print or other output. In accordance with an embodiment, a graphic layout logic automatically arranges the graphic objects within a target area, including determining a best combination of rows and/or columns of objects. Optional controls can also be provided to allow manual or user control of, e.g., overlapping, cropping, offsetting, or rotation of the graphic objects or images, for aesthetic design or other reasons. Examples of the types of graphic objects that can be arranged or laid out in this manner include digital photographs, text, clipart, graphical images, illustrations, software user interfaces, graphic elements such as icons, buttons, menus and whitespace, user interface windows, digital video or media streams, and other image media.

DETAILED DESCRIPTION

As described above, layouts of graphical elements, such as digital photographs intended for printing on products such as wall calendars, have traditionally been presented using grid or collage formats, both of which formats have their own behaviors and limitations.

In accordance with an embodiment, disclosed herein are systems and methods for layout of graphic objects such as photographic images and graphical elements, for electronic display, print or other output.

In accordance with an embodiment, the system can accept graphic objects, including content of any type, in any quantity, from any source, and automatically arrange those objects into an aesthetically pleasing layout. A graphic layout logic can automatically arrange the graphic objects within a target area, including determining a best combination of rows and/or columns of objects. Optional controls can also be provided to allow manual or user control of, e.g., overlapping, cropping, offsetting, or rotation of images, for aesthetic design or other reasons.

Examples of the types of graphic objects that can be arranged or laid out in this manner include digital photographs, text, clipart, graphical images, illustrations, software user interfaces, graphic elements such as icons, buttons, menus and whitespace, user interface windows, digital video or media streams, and other image media.

System for Layout of Graphic Objects

As described above, grid formats generally require that graphic objects used therewith be cropped to fit within fixed-aspect "sockets" in the grid. Although collage formats are generally more free-form, collages are usually pre-determined, requiring objects to be cropped or reduced in size; objects may also overlap, in which case there is danger of one graphic object covering important parts of another object.

In accordance with an embodiment, a system and method is described herein which can be used to address the above problems, including enabling layout of graphic objects, such as photographic images or graphical elements, for electronic display, print, or other output.

In accordance with an embodiment, the system allows for automatic and/or instant application of algorithmically generated grid-like or collage-like layouts, which can handle any number of graphic objects, of any combination of aspect ratios, without requiring the cropping or stretching of any object, or manual placement or adjustment.

Figure 1:
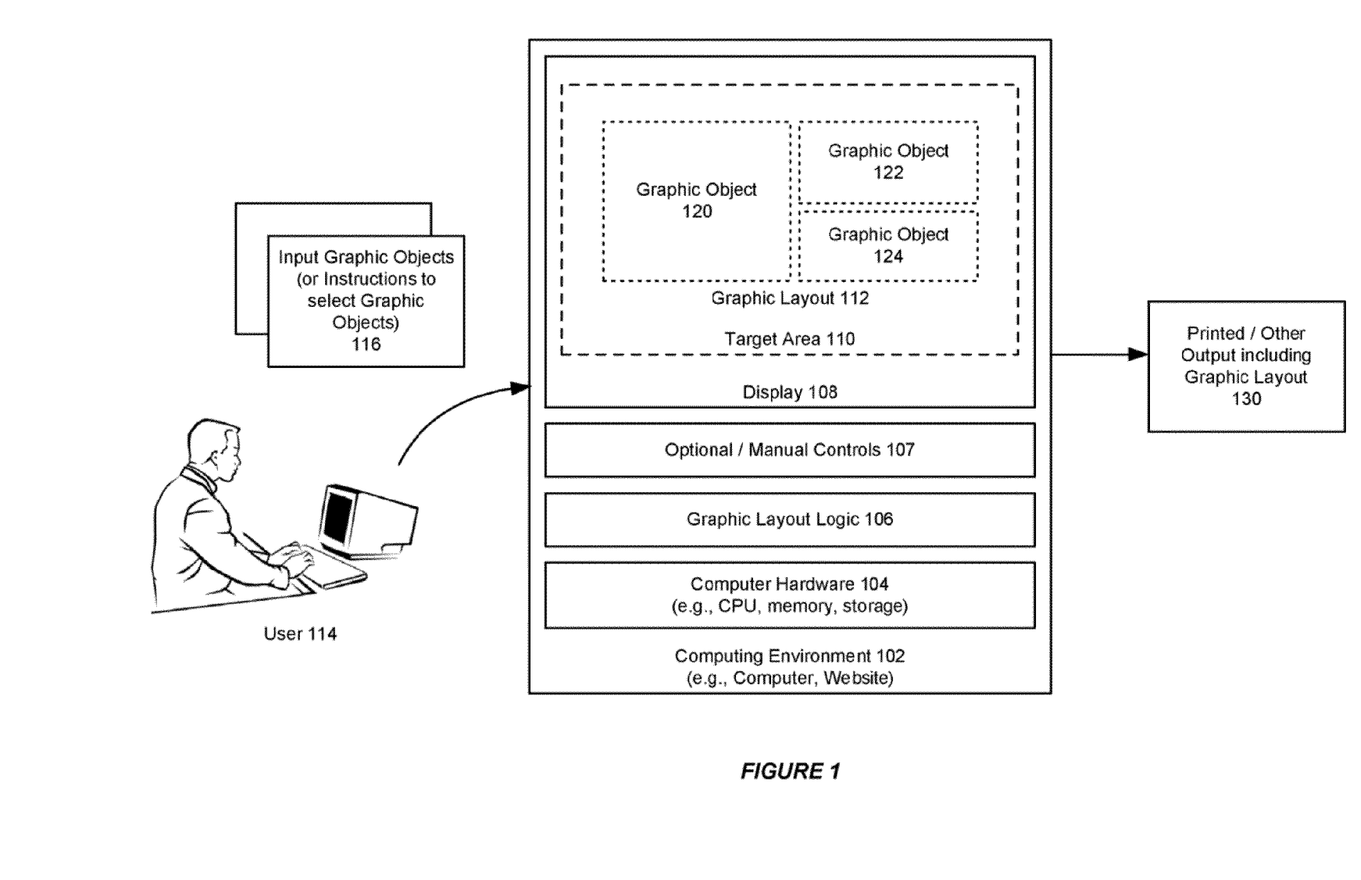
FIG. 1 illustrates a system for layout of graphic objects, such as images and graphic elements, for electronic display or print output, in accordance with an embodiment.

FIG. 1 illustrates a system for layout of images and graphic elements for electronic display or print output, in accordance with an embodiment.

As shown in FIG. 1, in accordance with an embodiment, the system includes a computing environment 102, such as that provided by a computer, website, or other computing environment. The computing environment can include computer hardware 104 (e.g., a processor/CPU, memory, storage, or other hardware). A graphic layout logic 106 is adapted to automatically arrange a plurality of graphic objects, prior to printing of the objects on products such as software applications, printed books, wall calendars, posters, or other products. Optional/manual controls 107 enable a user to perform further control of the graphic objects, if desired, prior to output. A display 108 enables display of a target area 110, which contains a graphic layout 112 of the graphic objects, as determined by the graphic layout logic, and any optional manual controls.

In accordance with an embodiment, a user 114 can provide (e.g., by uploading digital image or media files) a plurality or selection of graphic objects 116, or can provide instructions to utilize a selection of graphic objects that are already stored or otherwise provided at the computing environment. The graphic layout logic can then determine a graphic layout that includes an appropriate arrangement of the selected graphic objects 120, 122, 124. Subsequently, the graphic layout, together with its graphic objects, can be printed to a product, or provided as another form of output.

In accordance with an embodiment, the graphic layout logic is adapted to automatically determine a best fit of a selection of graphic objects for use within a target area, for example by determining a best combination of rows and/or columns, and the number of objects in each row or column, while taking into account the overall number of objects and the aspect ratios of each object.

In accordance with an embodiment, one or more user interface tools can be provided to enable the optional/manual control by a user over various algorithmic layout properties, in order to allow, e.g., intentional overlapping, offsetting, or rotation of images, for aesthetic design reasons. Options can also be provided to allow manual cropping, while the relative positioning and spacing of the images can be optimized to minimize the amount of cropping required to fit objects into the layout. The inclusion of such features can greatly reduce the possibility of important or otherwise desired image content from being lost (e.g., with photographs of people, a person's face), and also minimize the amount of manual or user intervention required, even when using layouts with cropped or overlapped images.

Graphic Layout Optimization Process

In accordance with an embodiment, the graphic layout logic is adapted to use a layout optimization process to determine a graphic layout that includes an appropriate arrangement of graphic objects.

In accordance with an embodiment, to begin the process, the selection of graphic objects (which can be provided by a user as described above, e.g., by uploading digital image or media files) that are to be included in the graphic layout, are first arranged at a consistent relative size, without regard to their aspect ratios.

To make best use of the available space within a target area, the graphic layout logic can first determine whether to use rows and/or columns, and how to arrange the graphic objects within those rows and columns. This can be accomplished by examining each of several possible layout configurations, including both row-based and column-based configurations, and choosing that particular configuration that has an overall aspect ratio closest to that of the target area.

Figure 2:
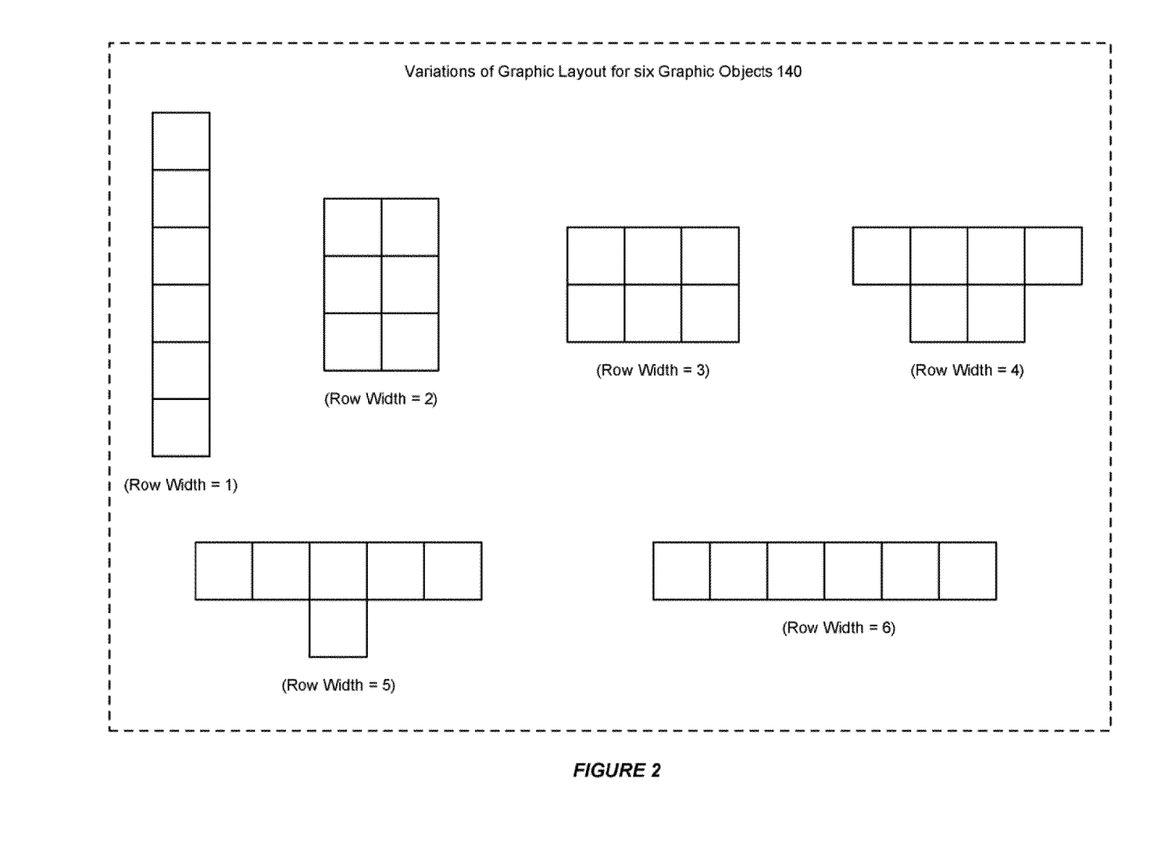
FIG. 2 illustrates a variety of ways in which a plurality of graphic objects can be arranged to fit within a range of possible aspect ratios for a target area, in accordance with an embodiment.

For example, FIG. 2 illustrates a variety of ways 140 in which a plurality of graphic objects (in this example, six objects) can be arranged to fit within a range of different possible aspect ratios for a target area, in accordance with an embodiment. In accordance with an embodiment, the six objects may be arranged in several possible layout configurations, with row widths from 1 object to 6 objects wide. Comparing each of these configurations against the target area, the system can then select the configuration that has the best fit to the aspect ratio of the target area. The aspect ratio of each object need not be taken into account at this stage; instead the objects can be simply placed into rows or columns and then sized the same relative to each other. The objects can then be shrunk or expanded, so that a largest dimension (e.g., the maximum row width) fits within the target area, and the resulting layout analyzed to determine how well it makes use of the total area available within the target area.

In accordance with an embodiment, the graphic layout optimization process can be duplicated for other possible layout configurations, to determine a best initial layout configuration.

As shown in FIG. 2, in accordance with an embodiment, a rectangular target area is shown, and a plurality of square or rectangular objects are arranged geometrically to best fit the aspect ratio of that rectangular target area. A typical application of such environment can be a rectangular screen area representing a photo book page. In accordance with other embodiments, the target area can alternatively be circular, irregular, or otherwise-shaped, as may the graphic objects to be arranged therein.

Uneven Numbers of Rows and/or Columns

In accordance with an embodiment, when the number of graphic objects is not evenly divisible into rows or columns that optimally fit a target area, the rows or columns can be automatically balanced to achieve an aesthetically pleasing appearance using appropriate horizontal or vertical centering. These possible arrangements can then be evaluated twice for optimal fit—one pass using columns, and another pass using rows.

Figure 3:
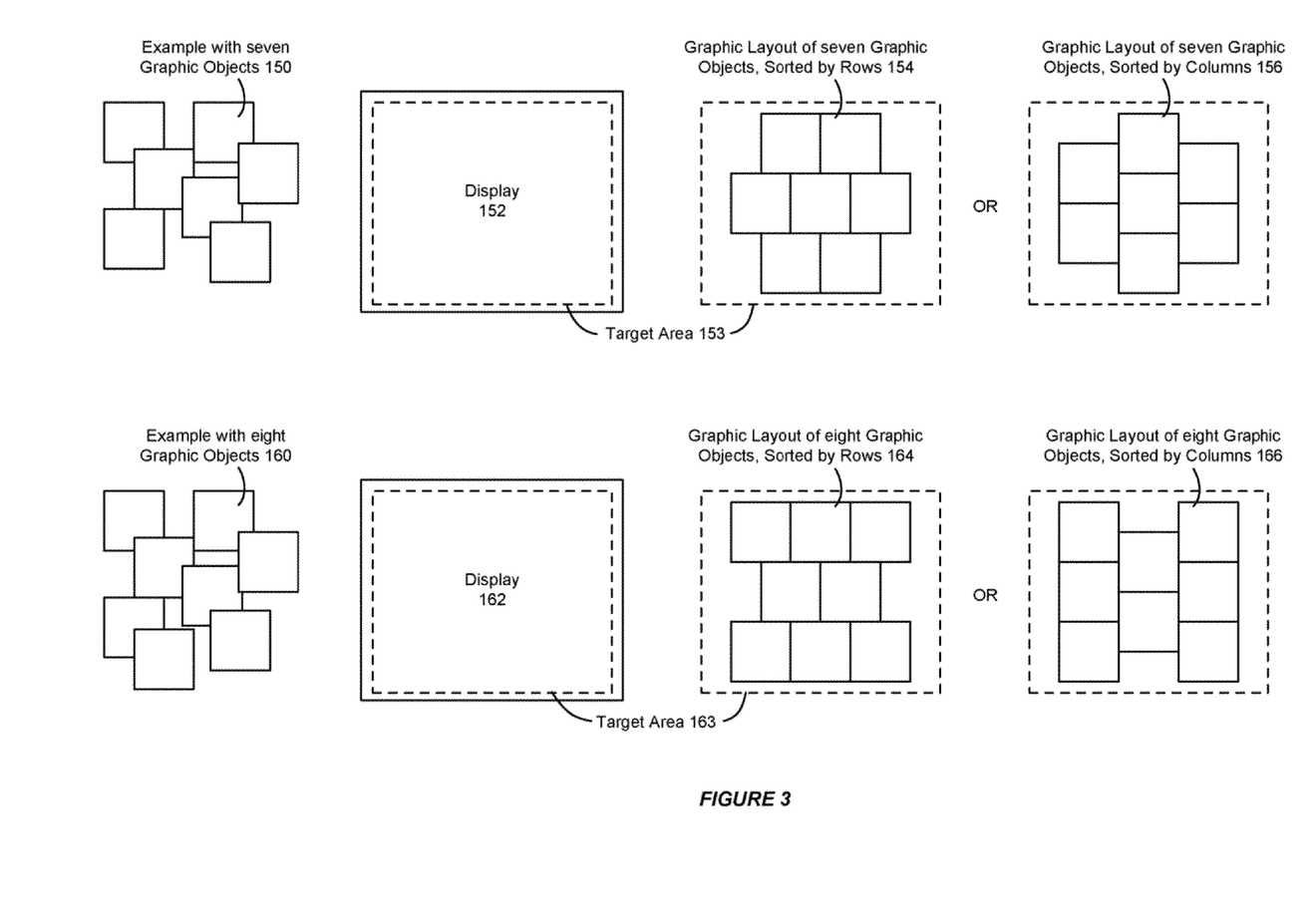
FIG. 3 illustrates a variety of ways in which a plurality of graphic objects can be arranged according to rows or columns that are balanced for use within a target area, to achieve an aesthetically pleasing appearance, in accordance with an embodiment.

For example, FIG. 3 illustrates a variety of ways in which a plurality of graphic objects (in these examples, seven or eight objects) can be arranged according to an uneven number of rows or columns that are balanced for use within a target area, to achieve an aesthetically pleasing appearance, in accordance with an embodiment.

As shown in FIG. 3, in accordance with an embodiment, in a first example, seven graphic objects 150 are arranged on a display 152, within a target area 153, and are either sorted by rows first 154, or by columns first 156, so as to determine a layout configuration that achieves an aesthetically pleasing appearance using appropriate horizontal or vertical centering. As further shown in FIG. 3, in accordance with an embodiment, in a second example, eight graphic objects 160 are arranged on a display 162, within a target area 163, and are again either sorted by rows first 164, or by columns first 166, so as to similarly achieve an aesthetically pleasing appearance using appropriate horizontal or vertical centering.

Graphic Layout Adjustment

In accordance with an embodiment, in order to automatically arrange graphic objects into a pseudo-grid graphic layout, that looks aesthetically much like a grid, but without those compromises necessary to fit within a fixed-grid, the arrangement of the objects can be adjusted or revised by a series of adjustments to their relative sizes, rather than just fitting those objects into a pre-determined grid.

In accordance with an embodiment, automatic adjustments can also be made to accommodate fixed inputs for a particular target area or object, such as a fixed aspect ratio of the desired target area containing the layout, or the aspect ratios of each object within the layout.

Figure 4:
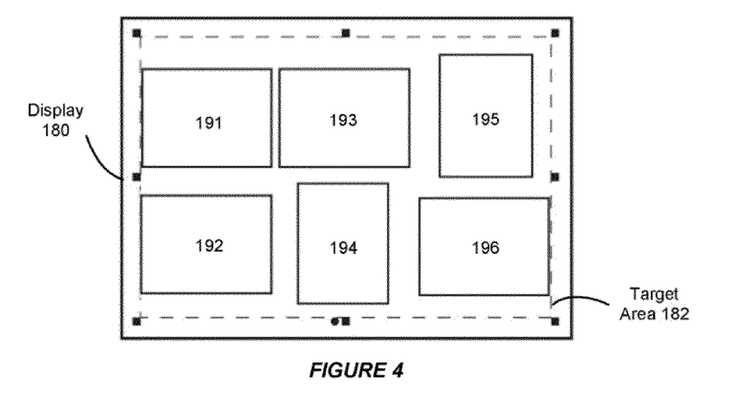
FIG. 4 illustrates an example usage of a system for layout of graphic objects, such as images and graphic elements, in which a plurality of rectangular-aspect objects is arranged as a graphic layout, and their size and placement subsequently adjusted to cover the target area.
Figure 5:
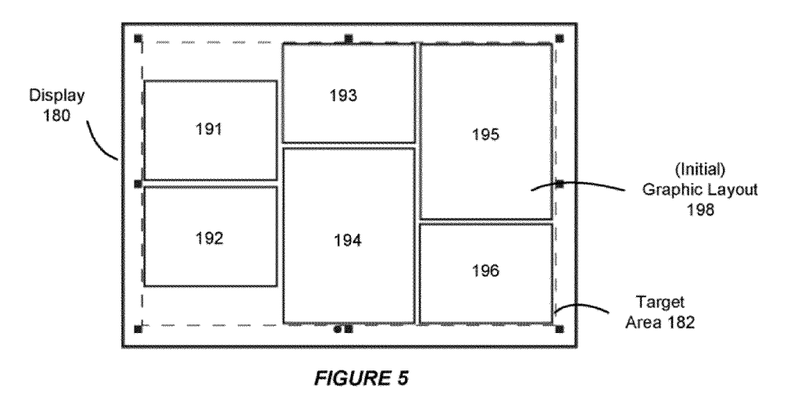
FIG. 5 further illustrates an example usage of a system for layout of graphic objects, in which a plurality of rectangular-aspect objects is arranged, and their size and placement subsequently adjusted to cover the target area.
Figure 6:
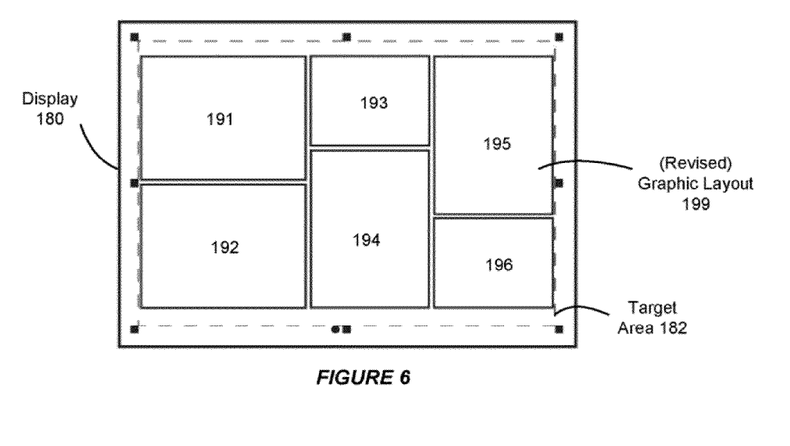
FIG. 6 further illustrates an example usage of a system for layout of graphic objects, in which a plurality of rectangular-aspect objects is arranged, and their size and placement subsequently adjusted to cover the target area.

FIGS. 4-6 illustrate an example usage of a system for layout of graphic objects, in which a plurality of rectangular-aspect graphic objects are arranged as a graphic layout of two rows, each of three objects, and their size and placement subsequently adjusted to cover a target area.

As shown in FIG. 4, in accordance with an embodiment, a display 180 and target area 182 layout, initially of two rows, each of three objects, are determined as a best initial fit of six objects 191, 192, 193, 194, 195, 196 into a rectangular target area. As shown in FIG. 4, a first step includes laying out the objects according to a layout optimization algorithm, with all objects at the same relative size, regardless of their aspect ratio.

Again, in the example illustrated, a rectangular target area is shown, and a plurality of square or rectangular objects are arranged geometrically to best fit the aspect ratio of that target area. In accordance with other embodiments, the target area can be circular, irregular, or otherwise-shaped, as may the graphic objects to be arranged therein.

As shown in FIG. 5, in a second step, an initial graphic layout 198 is determined in which all of the graphic objects within a particular column are made the same width (or all of the objects within a particular row the same height). This can be accomplished by scaling the sizes of the objects without cropping. As shown in FIG. 5, portrait objects may be now larger in order to match the width of the landscape objects, and the overall height of the layout has increased, but is still within the layout area.

As shown in FIG. 6, in a third step, an adjusted or revised graphic layout 199 is determined in which all of the columns are made the same height (or all of the rows the same width). This is accomplished by scaling all of the columns (and the graphic objects within them). As shown in FIG. 6, the two right columns are narrower, and the left column is wider, but they are all the same height.

It will be noted that, although the overall result shown in FIG. 6 has the appearance of a grid, none of the graphic objects were cropped in the process of adjusting the layout. Instead, their relative sizes are effectively varied so that they efficiently fit within the target area. A characteristic of this approach is that the resulting graphic pseudo-grid graphic layout may not always completely fill the target area; however, the graphic layout is always optimized to fill the largest possible area without cropping the graphic objects. In accordance with an embodiment, described in further detail below with respect to photographic images, an option can be provided to allow cropping of the graphic objects if the desire is to completely fill the target area.

In accordance with an embodiment, an example pseudo code is provided below which can be used for performing the layout steps described above. The example pseudo code is provided for the purposes of illustration and description. It is not intended to be exhaustive or to limit the invention to the precise forms disclosed, and many modifications and variations will be apparent to the practitioner skilled in the art.

```
// Graphic objects are already laid out as determined by an initial graphic layout optimization
    process //
First Pass:      // to build uniform width columns of objects //
Size = 1.0       // initial size of objects in a grid arrangement //
Spacing = 0.1    // inter-object spacing as a % of initial grid spacing (arbitrary value) //
Find maximum width object in column
For all objects in column {
    Determine scale factor to make the current object the same width as the maximum width
        object in the column
    Scale the object
    Adjust positioning of objects so they are centered vertically, and separated by the
        Spacing value
    Column Height = sum of adjusted object heights in column + (Number of objects −1) *
        Spacing }
Repeat for all Columns, keeping track of the max Column Height of all columns
Second Pass:
For all Columns on the page {
    Determine scale factor to make column the same height as the maximum height column
    Scale the objects in the column }
```

Adjust column positioning so they are centered horizontally, and separated by the Spacing value
// The above provides a layout of objects of arbitrary size; a normalization scale factor can be calculated to make the layout fit into the target area //
Repeat for all possible configurations of rows or columns, choosing the one that fits best into the available target area.

Figure 7:
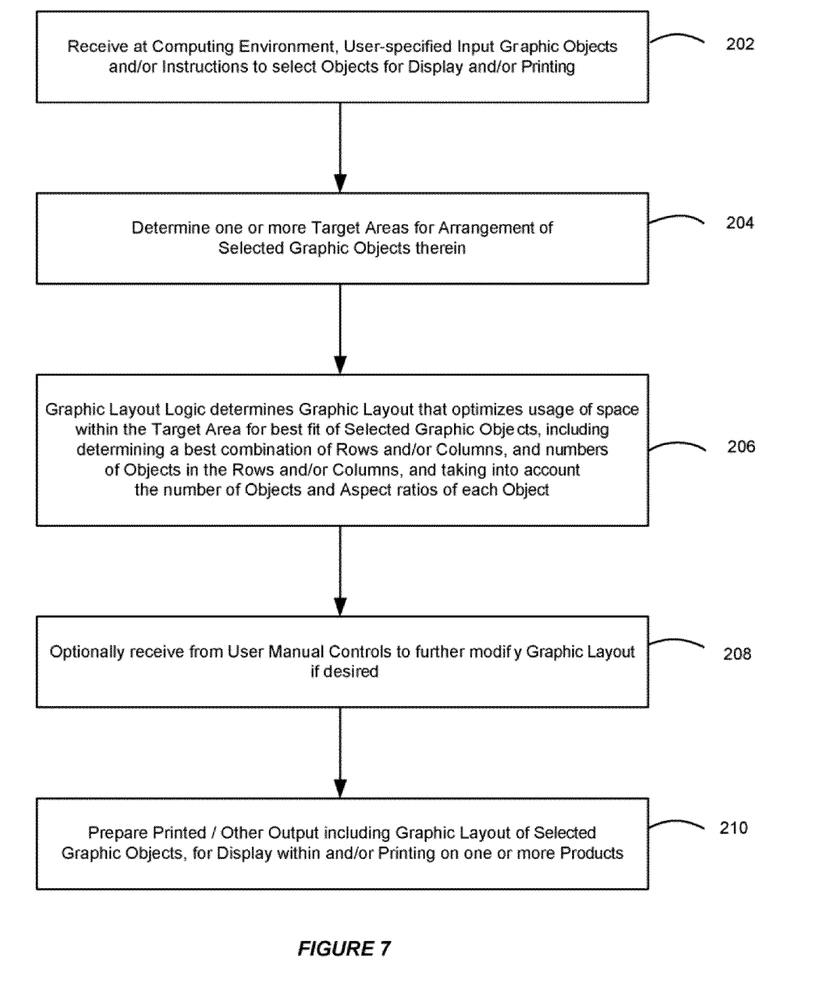
FIG. 7 illustrates a method for layout of graphic objects for electronic display or print output, in accordance with an embodiment.

FIG. 7 illustrates a method for layout of graphic objects for electronic display or print output, in accordance with an embodiment. As shown in FIG. 7, in accordance with an embodiment, at step 202, the system receives a plurality of user-specified input graphic objects and/or instructions to select graphic objects for display and/or printing. As described previously, a user can provide the graphic objects, e.g., by uploading digital image or media files.

At step 204, the system determines one or more target areas for arrangement of the selected graphic objects therein.

At step 206, a graphic layout logic determines a graphic layout that optimizes usage of space within the target area for a best fit of selected graphic objects, including determining a best combination of rows and/or columns, and numbers of objects in the rows and/or columns, and taking into account the number of objects and aspect ratios of each object.

At step 208, the system optionally receives from the user manual controls to further modify graphic layout if desired.

At step 210, the system prepares printed/other output including a graphic layout of the selected graphic objects, for display within and/or printing on one or more products.

Figure 8:
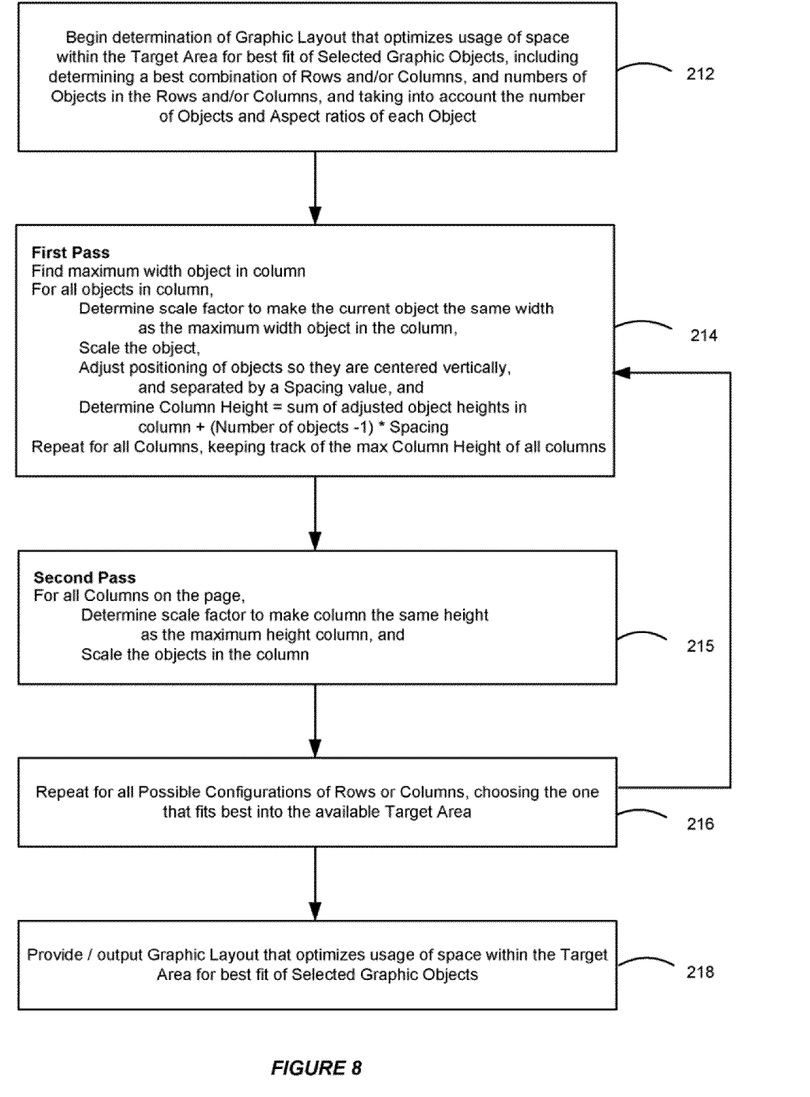
FIG. 8 further illustrates a method for layout of graphic objects for electronic display or print output, in accordance with an embodiment.

FIG. 8 further illustrates a method for layout of images and graphic elements for electronic display or print output, in accordance with an embodiment. As shown in FIG. 8, at step 212, the graphic layout logic determines a graphic layout that optimizes usage of space within the target area for a best fit of selected graphic objects.

At step 214, during a first pass, the graphic layout logic builds uniform height rows of objects, including, in an embodiment, finding a maximum width graphic object in a column, and, for all objects in a column, determining a scale factor to make the current object the same width as the maximum width object in the column, scaling the object, adjusting the positioning of objects so they are centered vertically, and separated by a spacing value, and determining a column height based on the sum of adjusted object heights in the column, and repeating for all columns, keeping track of the maximum column height of all columns.

At step 215, during a second pass, the graphic layout, for all columns on the page, determines a scale factor to make the columns the same height as the maximum height column, and scaling the objects in the column.

At step 216, the above steps are repeated for several (in some instances, all) possible configurations of rows or columns, ultimately selecting the configuration or layout of graphic objects that that fits best into the target area.

At step 218, the system provides/outputs the graphic layout.

The above examples generally describe row-first optimization. In accordance with an embodiment, the optimization can also be column-first, in which case during a first pass, the graphic layout logic can build uniform width columns of objects, including, for all objects in a column determining an objects height, width, and positioning; determine a maximum column height, which is repeated for all rows, keeping track of the maximum column height; and, during a second pass, for all rows on the page, determine a scale factor to make the columns the same height as the maximum height column and to scale the objects in the column.

Optional Features for Use with Photograph Layouts

In accordance with an embodiment, when the system is used to generate a layout containing fixed-aspect objects, such as digital photographs, an option can be provided to allow cropping of the photographs, if the user's desire is that the graphic objects (photographs) completely fill the target area. In this case, the layout optimization process is first applied, as described above, in order to make the best use of space within the target area without cropping. Then, an initial graphic layout in the form of a pseudo-grid is stretched to completely fill the target area, providing the final, adjusted or revised graphic layout. The aspect ratios of the photographs must of course be modified to achieve this stretching, which results in some cropping of the photographs. However, because the layout optimization has first been applied, the amount of cropping required is greatly minimized compared with approaches that arbitrarily fit photographs into a fixed-grid pattern.

Optimized Layout with/without Cropping Feature

Figure 9:
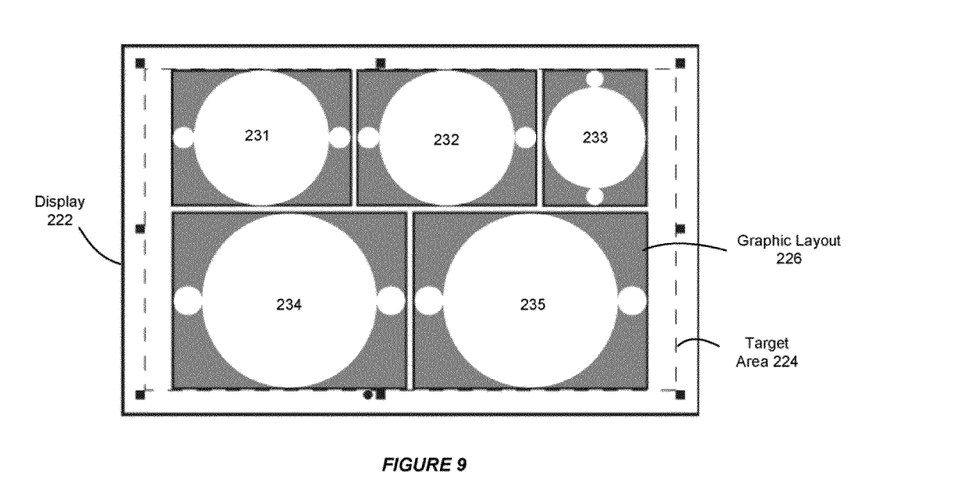
FIG. 9 illustrates an example usage of a system for layout of graphic objects, which includes a "Keep Photos Original Aspect" or similar option, in accordance with an embodiment.
Figure 10:
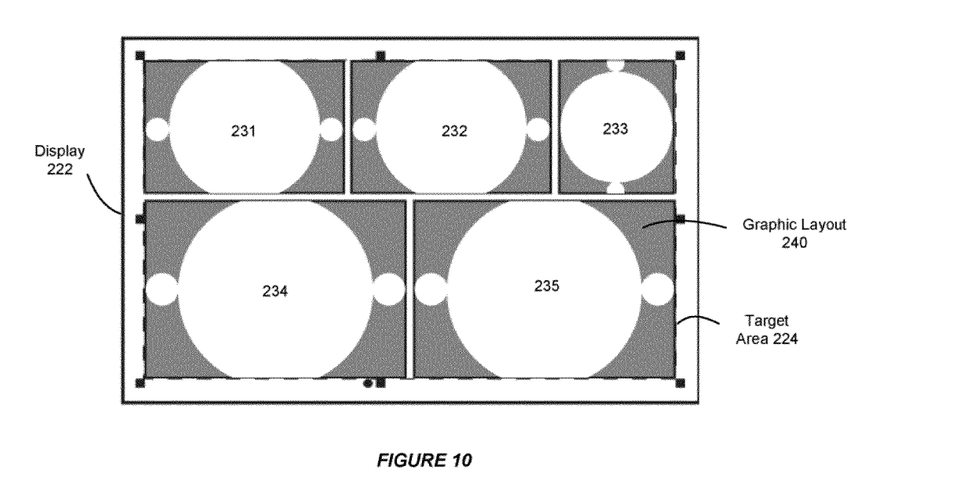
FIG. 10 further illustrates an example usage of a system for layout of graphic objects, in accordance with an embodiment.

FIGS. 9-10 illustrate an example usage of a system for layout of graphic objects, such as digital photographs, which includes a "Keep Photos Original Aspect" or similar option, in accordance with an embodiment.

As shown in FIG. 9, a display 222 can include a target area 224, for which a "Keep Photos Original Aspect" option has been enabled. Because the photographs 231, 232, 233, 234, 235 are fully intact, the initial graphic layout in the form of a pseudo-grid 226 may not fill the entire target area indicated by the dotted line with square handles.

As shown in FIG. 10, in which the "Keep Photos Original Aspect" option has been disabled, by allowing the photographs to be cropped slightly, the adjusted or revised graphic layout 240 may be stretched to fill the entire layout area. Note that in this example, the top and bottom of all of the photographs are slightly cropped to better fit the target area. If the layout optimization had chosen a different aspect for the optimized layout, the left and right edges might have been cropped. In accordance with an embodiment, a device such as a graphical user interface "hand" can be provided, so that the user can manually shift a photograph to change the area that is being cropped.

Comparison with Non-Optimized (Cropped) Layout

Figure 11:
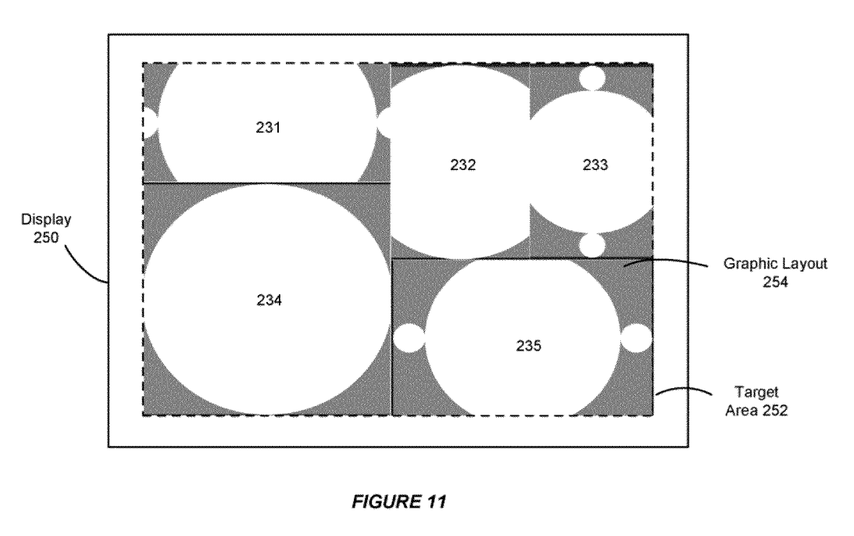
FIG. 11 illustrates an example in which a fixed-grid layout is used, illustrating how, with such a fixed-grid the photographs would be cropped to a greater degree.

FIG. 11 illustrates an example in which a fixed-grid layout is used, illustrating how, with such a fixed-grid the graphic objects, such as digital photographs, would be cropped to a greater degree. As shown in FIG. 11, which illustrates a display 250 that includes a target area 252, because the layout 254 has not been optimized, and the sockets for each photo are fixed dimensions, the photographs must be cropped to a much more significant degree. The above techniques can be used to reduce this shortcoming.

Additional Aesthetic Design Properties

In accordance with an embodiment, a range of properties or controls can optionally be provided, to allow for further aesthetic design or control over the graphic layout choices, and to further demonstrate advantages over rigidly-aligned grids. Examples of such properties are provided below, although the examples provided are not intended to be exhaustive or to limit the invention to the precise forms disclosed.

The first two properties described below (uniform spacing, and uniform rows/columns toggle controls) can be used to provide control over the "Graphic Layout Adjustment" steps leading up to the creation of a graphic layout, i.e., while many of the foregoing examples have described creation of a uniform pseudo-grid graphic layout, the uniform spacing and uniform rows/columns properties can be used to create layouts that may be somewhat non-uniform, but are nonetheless aesthetically pleasing.

Uniform spacing (toggle)—allows disabling of the adjustment in the second step of the graphic layout adjustment described above (i.e., determining an initial graphic layout in which all of the graphic objects within a particular column are made the same width, or all of the objects within a particular row the same height).

Uniform rows/columns (toggle)—allows disabling of the adjustment in the third step of the graphic layout adjustment described above (i.e., determining an adjusted or revised graphic layout in which all of the columns are made the same height, or all of the rows the same width).

Additional examples of such graphic layout properties are described below, again the examples provided are not intended to be exhaustive or to limit the invention to the precise forms disclosed.

Keep Objects Original Aspect (toggle)—allows disabling of the aspect-ratio constraint on objects, allowing the layout to fill the user's defined layout area. The layout optimization is still performed however, which minimizes the amount of object cropping required.

Flip Layout Horizontally (toggle)—reverses the order of columns, or the objects within rows.

Flip Layout Vertically (toggle)—reverses the order of rows, or the objects within columns.

Spacing (value in percentage, for example, relative to the size of a photo)—increases or decreases the spacing between objects in the layout. If a "both uniform" setting is enabled, spacing between all objects will be uniform. Negative values allow overlapping of objects.

Rotation (set of preset or adjustable values)—provides a variety of rotation settings using a focus point.

Rotation Randomness (value +−)—applies random values to increase or decrease the amount of rotation determined above, providing a more hand placed feel Offset rows/columns (value in percentage, for example)—skews the rows or columns in opposite directions relative to each other, breaking up the uniformity of the graphic layout.

Offset objects (value in percentage, for example)—skews objects at a right angle to their row or column, breaking up the uniformity of each row or column In varying combinations, the above parameters permit the creation of a wide variety of designs. They can also be used to create graphic layouts that aesthetically look much like collages, but are better optimized than any fixed approach to fill the area with the particular objects at hand.

Layout Presets

In accordance with an embodiment, some or all of the above properties can be saved in a "layout preset", allowing a designer or end-user to create a re-usable layout "style". This preset can then be applied to any number of objects of any aspect ratio while maintaining a consistent "look" to the layout. This may be especially useful for multiple applications within a given context, such as different pages within a book, a set of posters, a set of commemorative plates or mugs, etc. each with different specific objects placed on each member of a set.

Software User Interface Layouts

Software user interfaces have traditionally been treated as a set of screens with buttons or menus to permit navigation between the screens. Each software application thus has its own internal use-flow, and switching between applications typically involved an abrupt change in the user experience.

In accordance with various embodiments, systems and methods can be provided to accept as graphic objects a combination of user interfaces of any arbitrary dimensions from any number of applications, and automatically arrange them into a consistent layout on the screen, permitting easier navigation between screens within an application, or between multiple separate applications, while also optimizing the use of available space on the screen for each and all user interfaces.

For example, in accordance with an embodiment, the system or method can be used to lay out user interfaces for a software application, wherein the graphic objects are buttons on a user interface; or a collection of different user interface windows intended to be shown on a single screen. Additional examples include using the system or method to arrange different applications on the display of a smart phone, or different programs running on a personal computing device (e.g., an alternative way of displaying running windows similar in function to hitting the "window-key+tab" in Windows).

In accordance with an embodiment, animation techniques may also be used to maintain visual context when changing focus between user interfaces in the layout, or the addition or removal of interfaces from the layout.

Additional Applications and Use Cases

Although many of the embodiments described herein illustrate layout of graphic objects such as software images, or digital photographs, the systems, methods and techniques described herein can be similarly applied to other types of page layout, software interface, or general layout of objects. As another example, the system or method can be provided as part of a computer-based, online or other system or software application, such as a photo-sharing application which provides a user interface and allows a user to upload and display an arrangement of photographs and other graphic objects within that user interface, prior to printing or other usage. The techniques described herein can also be applied by a person skilled in the arts to other similar applications, such as arranging multiple video or media streams into a combined image, laying out multiple images onto a T-shirt, plate, or coffee mug, or a wide variety of other products and applications related to both the production of tangible final output products or arranging objects on a user interface or display screen for various software or hardware applications.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for enabling layout of graphic objects, such as photographic images or graphical elements, for electronic display, print, or other output, comprising:
    a computing environment which includes a computer hardware;
    a graphic layout logic which is adapted to automatically arrange a plurality of graphic objects;
    a display which includes a target area for use with the graphic objects;
    and wherein the system can receive a selection of the graphic objects, and wherein the graphic layout logic automatically scales and arranges the selection of the graphic objects as one or more columns or rows of a graphic layout within the target area, to make use of available space within the target area, or to meet one or more specified design criteria, including
        determining an initial graphic layout in which graphic objects within a plurality of columns are scaled to have a same width, or graphic objects within a plurality of rows are scaled to have a same height, and
        determining a revised graphic layout in which the plurality of columns in the graphic layout are scaled to have a same height, or the plurality of rows in the graphic layout are scaled to have the same width, by resizing columns or rows respectively, together with their graphic objects.

2. The system of claim 1, wherein the graphic layout logic is adapted to examine several possible layout configurations for the graphic objects within the target area, including both row-based and column-based configurations, and determine a configuration that has an overall aspect ratio closest to the available target area.

3. The system of claim 2, wherein the graphic layout logic automatically scales and arranges the selection of the graphic objects as a graphic layout, according to a layout optimization process, to optimally fill the target area, and with or without cropping or distorting the graphic objects.

4. The system of claim 1, wherein the system is provided as part of a computer-based, online, or other application, which provides a user interface and which allows a user to select and display an arrangement of graphic objects as a graphic layout within the user interface.

5. The system of claim 1, wherein one or more of the graphic objects are software images such as digital photographs, text, clipart, graphical elements, or illustrations.

6. The system of claim 1, wherein one or more of the graphic objects are software user interfaces, elements such as buttons, menus and whitespace, and other image media.

7. The system of claim 1, wherein one or more of the graphic objects are different user interface windows that are to be shown on a single interface screen with multiple windows.

8. The system of claim 1, wherein one or more of the graphic objects are a video or media stream to be arranged into a combined image, and to be displayed within a single display area.

9. The system of claim 1, wherein the system enables a user to associate properties with a graphic layout to allow for layout design or control choices other than a uniform pseudo-grid layout.

10. The system of claim 9, wherein the properties include one or more uniform spacing and uniform rows/columns toggle controls, which can be used to create layouts that are non-uniform.

11. The system of claim 9, wherein the properties include one or more options to keep an objects original aspect, flip a layout horizontally, flip a layout vertically, adjust spacing, adjust rotation, adjust rotation randomness, adjust offset rows/columns, and offset objects.

12. A method for layout of images and graphic elements for electronic display or print output, comprising the steps of:
    providing, at a computing environment which includes a computer hardware, a graphic layout logic which is adapted to automatically arrange a plurality of graphic objects;
    displaying a target area for use with the graphic objects; and
    receiving a selection of the graphic objects, and automatically scaling and arranging the selection of the graphic objects as a graphic layout within the target area, to make use of available space within the target area, or to meet one or more specified design criteria, including
        determining an initial graphic layout in which graphic objects within a plurality of columns are scaled to have a same width, or graphic objects within a plurality of rows are scaled to have a same height, and
        determining a revised graphic layout in which the plurality of columns in the graphic layout are scaled to have a same height, or the plurality of rows in the graphic layout are scaled to have the same width, by resizing columns or rows respectively, together with their graphic objects.

13. The method of claim 12, wherein the graphic layout logic is adapted to examine several possible layout configurations for the graphic objects within the target area, including both row-based and column-based configurations, and determine a configuration that has an overall aspect ratio closest to the available target area.

14. The method of claim 13, wherein the graphic layout logic automatically scales and arranges the selection of the graphic objects as a graphic layout, according to a layout optimization process, to optimally fill the target area, and with or without cropping or distorting the graphic objects.

15. The method of claim 12, wherein the system is provided as part of a computer-based, online, or other application, which provides a user interface and which allows a user to select and display an arrangement of graphic objects as a graphic layout within the user interface.

16. The method of claim 12, wherein one or more of the graphic objects are software images such as digital photographs, text, clipart, graphical elements, or illustrations.

17. The method of claim 12, wherein one or more of the graphic objects are software user interfaces, elements such as buttons, menus and whitespace, and other image media.

18. The method of claim 12, wherein one or more of the graphic objects are different user interface windows that are to be shown on a single interface screen with multiple windows.

19. The method of claim 12, wherein one or more of the graphic objects are a video or media stream to be arranged into a combined image, and to be displayed within a single display area.

20. A non-transitory computer readable storage medium, including instructions stored thereon, which when read and executed by a computer, cause the computer to perform the steps comprising:
   providing, at a computing environment which includes a computer hardware, a graphic layout logic which is adapted to automatically arrange a plurality of graphic objects;
   displaying a target area for use with the graphic objects; and
   receiving a selection of the graphic objects, and automatically scaling and arranging the selection of the graphic objects as a graphic layout within the target area, to make best use of available space within the target area, or to meet one or more specified design criteria, including
      determining an initial graphic layout in which graphic objects within a plurality of columns are scaled to have a same width, or graphic objects within a plurality of rows are scaled to have a same height, and
      determining a revised graphic layout in which the plurality of columns in the graphic layout are scaled to have a same height, or the plurality of rows in the graphic layout are scaled to have the same width, by resizing columns or rows respectively, together with their graphic objects.

21. A system for enabling layout of graphic objects, such as photographic images or graphical elements, for electronic display, print, or other output, comprising:
   a computing environment which includes a computer hardware;
   a graphic layout logic which is adapted to automatically arrange a plurality of graphic objects;
   a display which includes a target area for use with the graphic objects;
   wherein the system can receive a selection of the graphic objects, and wherein the graphic layout logic automatically scales and arranges the selection of the graphic objects as a graphic layout within the target area, to make use of available space within the target area, or to meet one or more specified design criteria; and
   wherein the graphic layout logic automatically scales and arranges the selection of the graphic objects as a graphic layout, according to a layout optimization process, to optimally fill the target area, and with or without cropping or distorting the graphic objects, including
      determining an initial graphic layout in which graphic objects within a plurality of columns are scaled to have a same width, or graphic objects within a plurality of rows are scaled to have a same height, and
      determining a revised graphic layout in which the plurality of columns in the graphic layout are scaled to have a same height, or the plurality of rows in the graphic layout are scaled to have the same width, by resizinq columns or rows respectively, together with their graphic objects.

22. The system of claim 21, wherein the graphic layout logic is adapted to examine several possible layout configurations for the graphic objects within the target area, including both row-based and column-based configurations, and determine a configuration that has an overall aspect ratio closest to the available target area.

* * * * *